April 20, 1965 S. W. LUCAS 3,179,235
TRIMMING MEANS FOR GRANULATE BULK-LOADED CARGOES
Filed Feb. 28, 1963 3 Sheets-Sheet 1
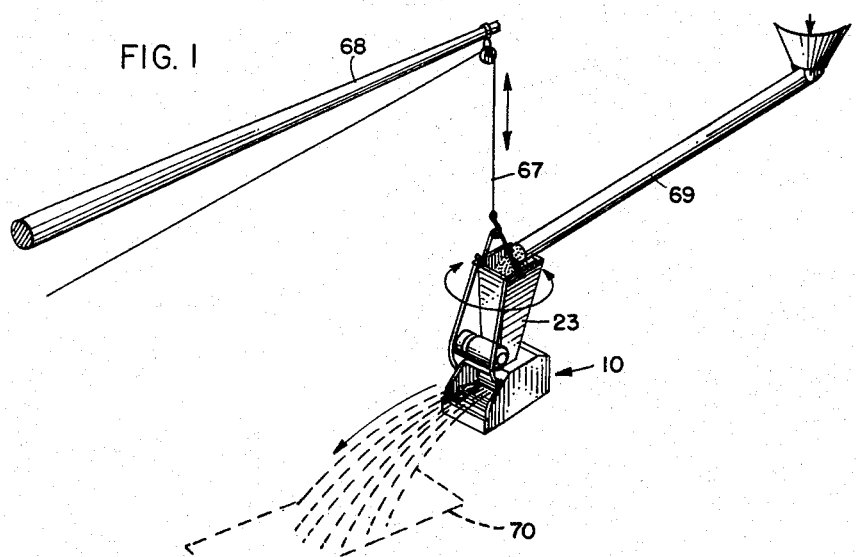
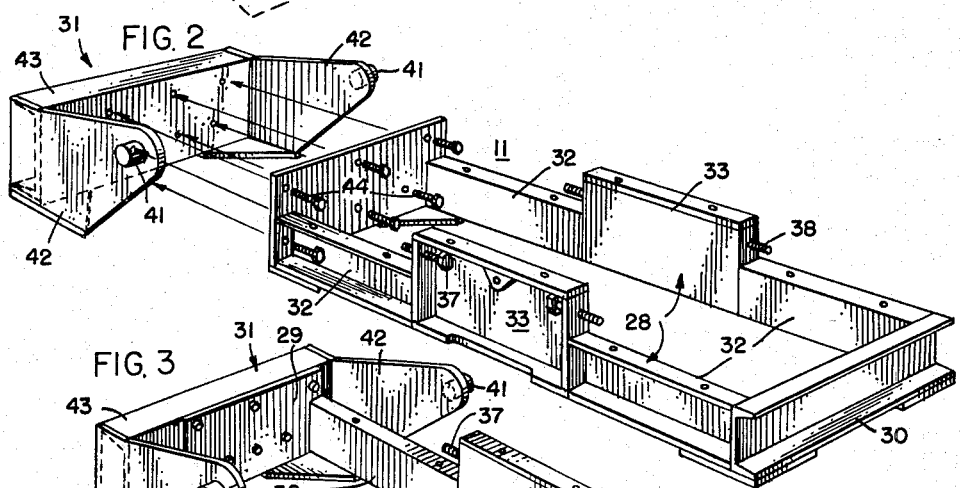
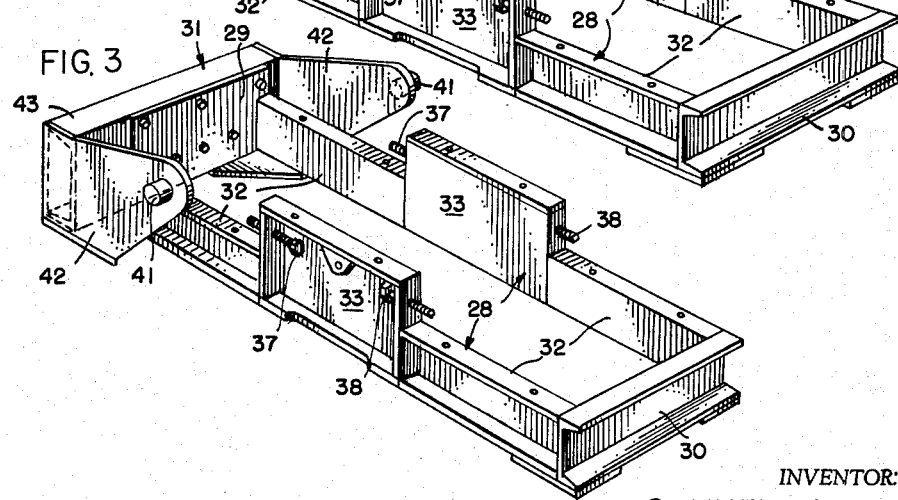
INVENTOR:
SAMUEL W. LUCAS
BY
ATT'YS April 20, 1965     S. W. LUCAS     3,179,235
TRIMMING MEANS FOR GRANULATE BULK-LOADED CARGOES
Filed Feb. 28, 1963     3 Sheets-Sheet 2
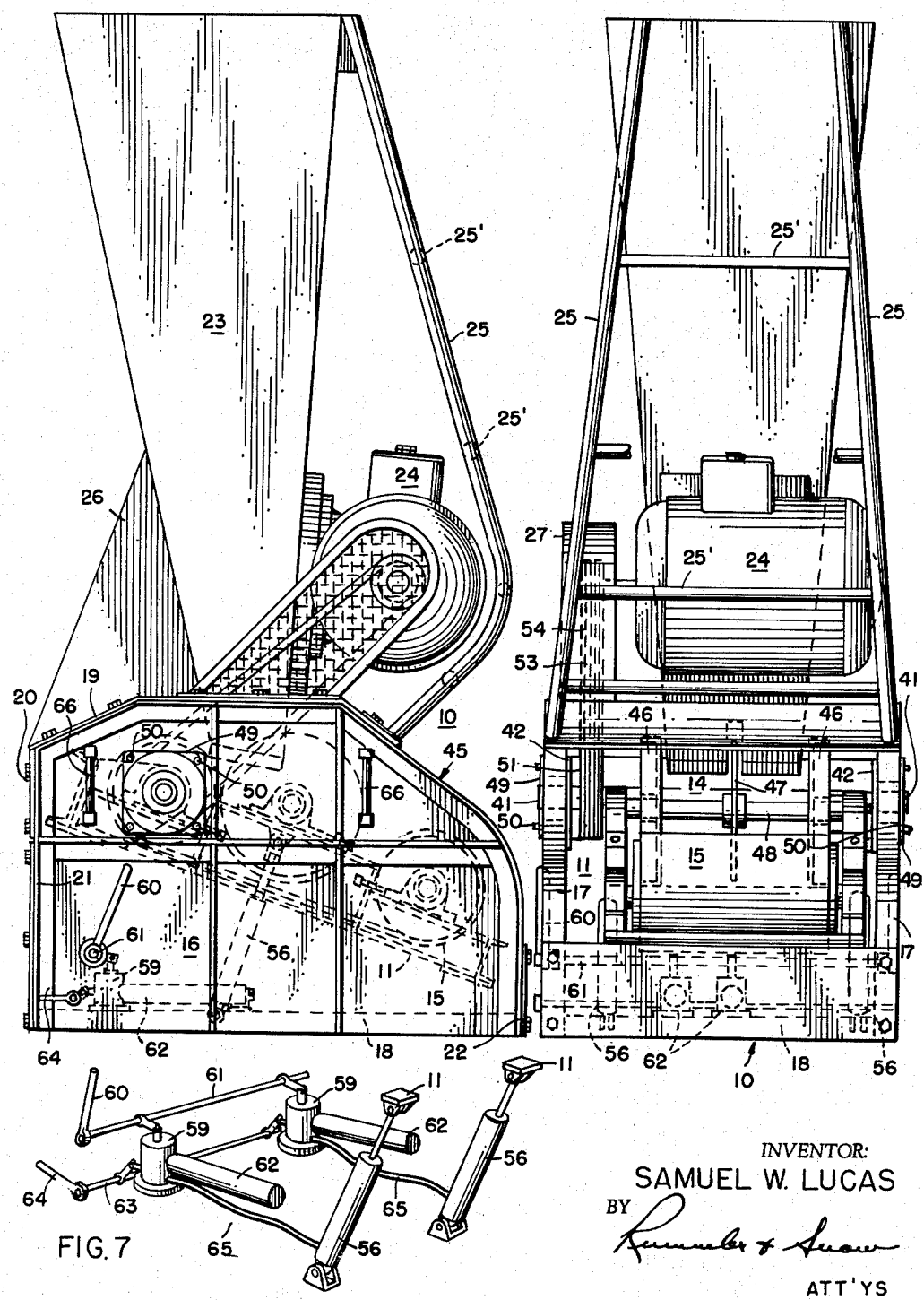
INVENTOR:
SAMUEL W. LUCAS
BY
ATT'YS

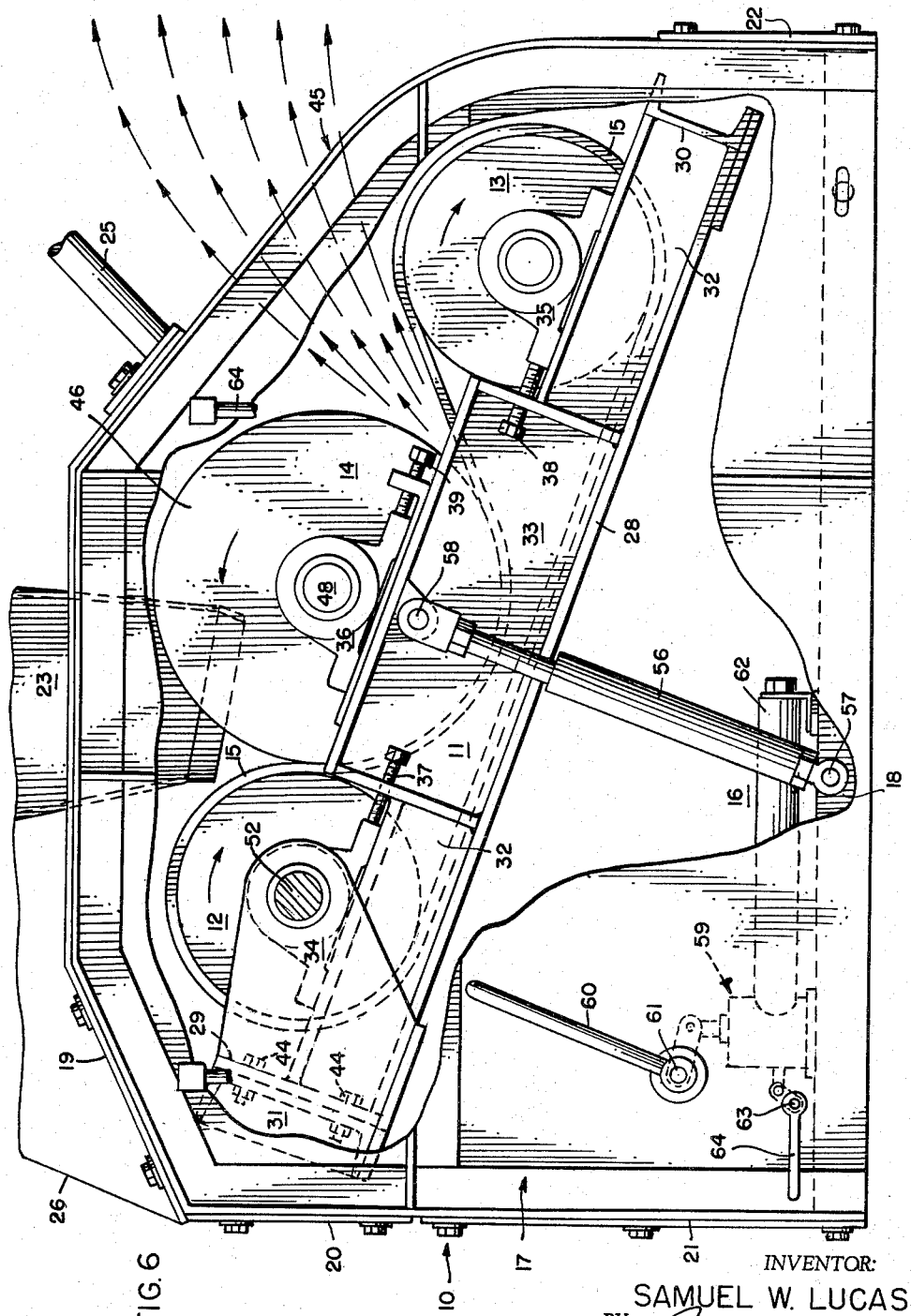

United States Patent Office 3,179,235
Patented Apr. 20, 1965

3,179,235
TRIMMING MEANS FOR GRANULATE
BULK-LOADED CARGOES
Samuel Walter Lucas, Montreal, Quebec, Canada, assignor, by mesne assignments, to Samuel Walter Lucas, St. Louis Park, Minn.
Filed Feb. 28, 1963, Ser. No. 261,623
8 Claims. (Cl. 198—128)

This invention relates to equipment for trimming bulk-loaded granulate cargoes in extensive storage spaces.

The trimming of bulk-loaded granulate, and generally free flowing materials, such as sugar, grain, cement and coal, in the holds of vessels, or other deep and wide storage spaces, is attained conventionally by equipment suspended below a gravity-flow chute and which, in addition to permitting a controlled discharge of the granulate vertically downward into the space, also effects the discharge of the granulate horizontally outward into the bordering portions of the cargo space. As shown in such of my patents as #2,920,746 and #2,979,185 this equipment involves a supporting structure wherein is housed a material throwing-mechanism comprising a belt traveling between and around a pair of pulleys and in contact with an intermediate deflecting rotor from which the granulate is projected horizontally outward at an angle and over a distance determined by the reactive shifting of the supporting structure on its overhead suspension as well as by the linear speed of the belt.

From time to time such a granulate throwing-mechanism requires adjustment and/or replacement of the belt, pulleys, and deflecting rotor. Since such apparatus is comparatively massive it has to be lowered onto a suitable platform to permit access to the throwing-mechanism. With conventional equipment, such as shown in the above-mentioned patents, this means a complete shut-down and a costly loss of time to disassemble the throwing-mechanism, effect its repair and accurate alignment, and then to re-assemble it in the supporting structure.

The main objects of this invention are, therefore, to provide an improved demountable arrangement of the throwing-mechanism for equipment required for trimming granulate bulk-loaded cargoes; to provide an improved form of granulate throwing-mechanism of this kind, detachably connected to a supporting structure, so as to permit the immediate replacement of a throwing unit requiring repair or adjustment by a new or reconditioned unit; to provide improved means for variably angulating the throwing-mechanism on the supporting structure to facilitate controlling the throwing distance for regulating the deposit of the granulate in the more remote portions of the storage space; and to provide an improved mechanism of this kind of such simple construction as to make its manufacture very economical, its functioning extremely efficient and effective, and its attachment to and detachment from the supporting structure conveniently facile.

A specific embodiment of this invention is shown in the accompanying drawings in which:

FIGURE 1 is a miniature perspective view of bulk cargo trimming equipment suspended from a derrick boom and connected to a gravity loading chute for loading granulate material into a storage space, such as ships hold;

FIG. 2 is an exploded perspective of the improved two-section base and pivot means forming a part of a throwing-mechanism assembly constructed in accordance with this invention;

FIG. 3 is a comparable view showing the assembled base and pivot members;

FIG. 4 is a side elevational view showing the improved throwing-mechanism operatively positioned on the main supporting structure of the loading apparatus;

FIG. 5 is a front view of the same;

FIG. 6 is an enlarged, side elevational view of the supporting-structure-mounted granulate throwing-mechanism, with portions of the supporting structure being broken away to more clearly show the arrangement of the internal parts of the mechanism; and FIG. 7 is a schematic view illustrating the arrangement of the pumps and hydraulic rams for varying the throwing angle of the thrower mechanism.

The essential concept of this invention is to provide a thrower unit that is readily separable, as a complete unit, from the main supporting structure of the loading apparatus and which is mounted on a pivoted trunnion bracket for angular adjustment, in the vertical plane, relative to the supporting structure to facilitate control of the trajectory of the granulate as it is thrown outwardly into the bordering portions of the storage space being loaded.

A granulate throwing-mechanism, for trimming bulk-loaded cargoes in storage space, embodying the foregoing concept, comprises a supporting structure 10 wherein a frame 11, journaling a pair of pulleys 12 and 13 and a compacting rotor 14 traversed by a belt 15, is hinged at one end to the supporting structure 10 for angular adjustment relative thereto by a hydraulic motor-system 16.

The supporting structure 10 is here shown as comprising a pair of side elements 17 positioned in spaced upright relationship on a base 18 and spanned by a top closure plate 19 and end plates 20, 21 and 22, all bolted to the perimeters of the side elements 17. The side elements 17 are shown as frame-work fabricated from angle iron bars overlaid interiorly with metal plates. Thusly assembled the structure 10 forms an open ended box-like housing for the hereinafter-described granulate throwing-mechanism.

The top closure plate 19 mounts a granulate chute 23, a driving motor 24, a skid-rail or guard 25 and a deflector-brace 26. As shown in FIGS. 4 and 6, the plate 19 is detachably bolted to the perimetrical flanges of the side element 17 so that when removed the entire top area of the housing 10 is opened and free access is afforded to install or remove the hereinafter-described throwing-mechanism as a unitary assembly, as occasion may require. The end plates 20, 21 and 22 are flat metal plates bolted to the respective ends of the side element 17 and function to complete the box-like housing structure.

The chute 23, of more or less conventional form and dimension, is suitably anchored to the plate 19 for directing the gravity-flowing granulate onto the belt 15 between the pulley 12 and the rotor 14. The rotor 14 functions as a compacting and driving means to confine the material being handled to the belt surface and to impart the belt velocity to the material being handled, as described in my before-mentioned patents and in my Patents #2,622,722, 3,039,594 and 3,039,595.

The motor 24 is shown secured to the chute 23 and provided with a conventional belt-guard 27. The side members of the guard means 25, spanned by suitable cross braces 25', are arched outwardly from their end connections to the top closure plate 19 and the upper end of the chute 23 to span the motor 24. So arranged, this guard means 25 serves to protect the motor and the housing 10 from damage due to hitting the edge of a hatch as the mechanism is being raised from or lowered into a hold. The brace plate 26 serves the same function.

As shown in FIGS. 2 and 3 the thrower mechanism base or frame 11 comprises pulley-rotor journaling side members 28 and transverse members 29 and 30, the rear member 29 being a flat plate adapted for attachment to a trunnion bracket 31. As shown, the side members 28 are structured mainly from channel members to form the front and rear journal-supporting sections 32 and the medial or intermediate sections 33 disposed above the plane of the front and rear sections so as to locate the shaft of the hereinafter-described rotor 14 above the axes of the pulleys 12 and 13. On these medial and end portions of the side members 28 are mounted the respective bearings 34, 35 and 36 for the shafts of the pulleys 12 and 13 and the rotor 14. Such bearings 34, 35 and 36 are slidably arranged on the side members 28 for adjustment by the respective bolts 37, 38 and 39 to permit appropriate tensioning of the belt 15 and alignment of the rotor and pulley shafts as is required for the effective operation of the throwing-mechanism.

The trunnion bracket or hinging section 31, for the frame 11, is here shown as a clevis-like bracket (FIG. 2) having outwardly-extending, axially-aligned trunnions 41 mounted on the outer ends of parallel arms 42 extending perpendicularly from the back of a channel bar 43. The trunnion arms 42 are spaced apart to embracively seat the trunnion bracket 31 over the end of the end plate 29 of the frame 11. The channel bar 43 of the trunnion bracket is anchored to the frame end plate 29 by a number of bolts 44 so that the frame 11 is literally hung endwise from the bracket 31 for swinging movement about the axes of the trunnions 41. As shown the trunnions 41 are located on the arms 42 so as to be axially aligned with the axes of the bearings 34 which support the shaft of the pulley 12. Thus the pulley 12 is always in a fixed position relative to the motor 24 regardless of the angular position of the frame 11 and bracket 31.

The pulleys 12 and 13 are conventional roller units journaled in the respective bearings 34 and 35. The deflecting rotor 14 may be of any of the forms heretofore employed in this type of trimming equipment as, for example, those shown in my previously mentioned patents. Such a rotor 14 has flanged end disks 46 and one or more intermediate disks 47 (FIG. 5) mounted on and keyed to rotate with a shaft 48 journaled on the intermediate bearings 36. The flanged end disks 46 are spaced apart to embrace the discharge end of the chute 23, as shown in FIGS. 5 and 6 and for rolling contact with the lateral perimeters of the belt 15.

The belt 15 may be any construction as conventionally used for such trimming equipment. As shown, the belt 15 is of a length to span and travel over and around the pulleys 12 and 13 and under the opposed periphery of the end disks 46 of the deflecting rotor 14. By means of the adjusting screws 37, 38 and 39 the belt 15 is tensioned to prevent slip on the driving pulley 12 and to secure the desired effect in the throwing of the granulate, entering from the chute 23, into an arc horizontally outward through the open front end 45 of the housing 10; and the pulleys are accurately aligned in parallel relation with each other so that the belt 15 will run true.

The trunnion bracket 31, supporting the frame 11 for swinging movement, is hinged on the supporting structure 10 by seating the trunnions 41 in suitable bearings carried by mounting plates 49 (FIG. 5) which are secured onto the side elements 17 by suitable bolts 50. A grooved sheave 51, keyed to the end of the shaft 52 mounting the pulley 12, is connected in the usual manner by belts 53 to a sheave 54 on the motor 24. As before indicated the axis of the trunnions 41 is coincident with the axis of the shaft 52 for the pulley 12 and, thus swinging of the frame 11 on the trunnions 41 does not alter the relationship of the sheaves 52 and 54.

The hydraulic motor system 16 for raising and lowering the thrower frame 11, to alter the trajectory of the material discharged from the belt 15, comprises a pair of rams or jacks 56, disposed one on each side of the frame 11, each pivotedly mounted on the base 18 by a respective hinge 57 and connected to the frame 11 by a respective pivot 58. Each of the rams 56 is actuated by its own pump 59 and the two pumps are arranged for simultaneous manual operation by a single pump handle 60 mounted on across shaft 61 which, in turn, is arranged to reciprocate the pump piston.

The purpose of dual pumps for operating the rams 56 is to assure that the two rams will be equally loaded so that no twisting or rocking of the thrower frame will occur during its up and down adjustment, and to assure such operation of the hydraulic system each pump has its own fluid reservoir 62 in addition to driving its own ram for lifting the thrower unit.

Lowering of the thrower unit is accomplished by bleeding the two rams 56 into the reservoir 62, simultaneously and at the same rate, and this is accompuished by suitable valves, not shown, at the respective pumps, which valves are operated simultaneously by a cross shaft 63 actuated manually by a handle 64. The handles 60 and 64 are preferably located adjacent each other at one side of the housing 10, as indicated in FIGS. 4 and 6, and the pumps and reservoirs are mounted on the base 18 of the housing 10. Also, as shown in FIG. 7, the pumps 56 are hydraulically connected with their respective rams by the flexible hoses 65.

To facilitate the maneuvering of the throwing-mechanism during use in trimming bulk cargoes in storage space, pairs of hand grips 66 (FIG. 4) are secured to the side elements 17 of the supporting structure 10. By this means the machine is readily turned by an operator so as to face the discharge end 45 in the desired direction.

In use, the entire apparatus is suspended by cable 67 from a boom 68 of a suitable derrick so that it may be readily lowered into a hold and held suspended at the desired elevation. The material to be loaded is then fed to the chute 23 by suitable means, such as a pipe or conduit 69 leading to the source of supply, and is discharged into the hold by the thrower mechanism over a range determined by the adjusted angle of the thrower frame 11 and indicated by the dotted outline 70 in FIG. 1.

This structuring of the throwing-mechanism separate from the supporting structure 10 possesses the very important advantages of making possible the immediate replacement, within the supporting structure 10, of one throwing-mechanism by another when the one requires repair and/or adjustment. The positioning of such a throwing-mechanism in and/or removal thereof from the supporting structure 10 requires that the supporting structure be set on a suitable platform or dock. After removing the top closure 19 the throwing-mechanism frame 11 may be connected to and supported by a crane while the frame 11 is being unbolted from the trunnion bracket 31 and the rams 56 are being disconnected. The entire thrower unit may then be lifted from the housing 10 and immediately replaced by another unit with a minimum of down-time and delay in the cargo loading operation.

Obviously, such a throwing-mechanism unit as herein described may be adjusted and thoroughly tested before it is installed in the supporting structure 10 so that once it is connected to the trunnion bracket and the rams, the remaining apparatus, such as the chute 23 and motor 24, can be immediately installed and the machine put into operation without further delay for final adjustment procedures.

There also is the advantage of allowing all repair, testing and adjustment of each throwing-mechanism unit to be done in a suitable shop or maintenance bay apart from the busy loading area; and the interchangeability of the thrower unit permits keeping on-hand spare units equipped with special belts and compacting rotors specially designed for handling particular materials.

Although but one specific embodiment of this invention has been herein shown and described, it will be understood that numerous details of the construction shown may altered or omitted without departing from the spirit of the invention as defined by the following claims.

I claim:
1. A throwing apparatus for use in trimming bulk loaded quantities of granulate material in a storage space comprising, a box-like housing having a horizontally directed opening at one end and means for free swinging vertical suspension of the housing in said storage space, a throwing mechanism assembly mounted within said housing for discharging material through said one end opening, and means on the upper side of said housing for feeding granulate material gravitationally into said throwing mechanism; said throwing mechanism assembly comprising a generally rectangular base frame having front and rear pulleys journaled thereon on opposite sides of an intermediate rotor means, said pulleys and intermediate rotor means having parallel horizontal axes, a belt mounted to travel over and around said pulleys and contactively under said intermediate rotor means, and means for driving one of said pulleys; and means for detachably supporting said base frame in said housing to provide for removal of said throwing mechanism assembly from the housing as an independently operable unit.

2. A throwing apparatus as defined by claim 2 wherein the means for detachably supporting the base frame comprises a clevis-like bracket having oppositely extending axially aligned trunnions journaled in bearings fixedly mounted on the vertical sides of said housing, and the bracket is detachably secured to the rear end of the said base frame whereby the frame is swingable about a horizontal axis.

3. The throwing apparatus defined by claim 2 wherein the said bracket mounts its trunnions to be axially aligned with the rear pulley of the throwing mechanism assembly when the bracket is attached to the rear end of said base frame, and the means for driving one of the pulleys is mounted on the housing structure and drivingly connected with the said rear pulley.

4. The throwing mechanism defined by claim 2 wherein a pair of jacks mounted on said housing structure are connected with opposite sides of the said frame for raising and lowering the front end thereof, and means are provided on said housing structure for actuating said jack means simultaneously.

5. A throwing apparatus for use in trimming bulk-loaded cargoes in a storage space comprising,
   (1) a throwing mechanism assembly having
      (a) an open, rectangular frame having a pair of side members and front and rear end members, the bottom surfaces of which lie in a common plane,
      (b) front and rear pulleys disposed transversely of said frame and journaled on the side members,
      (c) a compacting rotor means disposed transversely of the frame between said pulleys and journaled on the said side members, and
      (d) a belt arranged for travel between and around the pair of pulleys and under and in driving contact with the compacting rotor means,
   (2) a box-like supporting structure for housing said throwing mechanism assembly and including means on its top for feeding granulate material between said belt and said compacting rotor, and
   (3) means pivoted on a fixed horizontal axis for detachably mounting the frame within said supporting structure for pivotal movement of the frame about said axis and to permit removal and replacement of the throwing assembly as a complete unit.

6. A throwing mechanism as defined by claim 5 wherein the last named means comprises a clevis-like bracket having arms embracing the side members of said frame adjacent the rear end thereof, and each of the arms has an outwardly projecting trunnion horizontally journaled on said supporting structure, the rear end member of said frame being detachably bolted onto said bracket.

7. A throwing mechanism as set forth in claim 5 wherein a hydraulic ram is interposed between the frame and the supporting structure at each side of the frame for altering the vertical angularity of the frame relative to the supporting structure, separate pump means is provided on said supporting structure for actuating each ram, and means are provided for operating the pumps simultaneously and at the same rate.

8. A throwing apparatus for use in trimming bulk-loaded cargoes in a storage space comprising,
   (a) supporting structure having a pair of spaced upright side elements mounted on a base to form an upwardly-opening housing,
   (b) a closure plate removably attached to the upper edges of the side elements and mounting a feeding-chute for granulate material,
   (c) an open rectangular frame having a pair of channel shaped side members, the medial portions of the upper legs of which are elevated above the top surfaces of the opposite end portions, and front and rear end members connecting the ends of the said side members,
   (d) pairs of journal bearings axially aligned on the upper legs of each of the medial and end portions of the side members,
   (e) pulleys disposed transversely of the frame and journaled on the pairs of bearings on the end portions of the side members,
   (f) a compacting rotor axially parallel with the pulleys and journaled on the pair of bearings on the medial portions of the side members,
   (g) a belt arranged for travel between and around the pair of pulleys and under and in driving contact with the compacting rotor,
      (1) said feeding chute being disposed to deliver granulate material between said belt and the compacting rotor for discharge from the front end of the frame,
   (h) a clevis-like bracket detachably mounted on the rear end member of the frame and having forwardly projecting arms embracing the frame and mounting outwardly-extending trunnions axially aligned with the rear pulley on said frame for hinging the frame on the side elements of the supporting structure,
   (i) means on said supporting structure for driving the rear pulley on said frame, and
   (j) a hydraulic motor means interposed between the side members of said frame and the supporting structure for pivoting the frame on said trunnions to raise and lower the front end of the frame relative to the base of the supporting structure.

References Cited by the Examiner
UNITED STATES PATENTS
716,201  12/02  De Brouwer _____ 198—128

OTHER REFERENCES
German printed application, Otto Schneider, F14b19 VI/5d, Aug. 16, 1956.

SAMUEL F. COLEMAN, Primary Examiner.
WILLIAM B. LA BORDE, Examiner.